(12) United States Patent
Dwan'Isa et al.

(10) Patent No.: US 7,125,950 B2
(45) Date of Patent: Oct. 24, 2006

(54) POLYOL FATTY ACID POLYESTERS PROCESS AND POLYURETHANES THEREFROM

(75) Inventors: Jean-Pierre L. Dwan'Isa, Liege (BE); Lawrence T. Drzal, Okemos, MI (US); Amar K. Mohanty, Okemos, MI (US); Manjusri Misra, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 76 days.

(21) Appl. No.: 10/835,428

(22) Filed: Apr. 29, 2004

(65) Prior Publication Data

US 2004/0242910 A1 Dec. 2, 2004

Related U.S. Application Data

(60) Provisional application No. 60/466,823, filed on Apr. 30, 2003.

(51) Int. Cl.
*C08G 18/36* (2006.01)
(52) U.S. Cl. ............... 528/74.5; 521/172; 252/182.18; 554/29; 554/30; 554/174; 554/227
(58) Field of Classification Search ............... 521/172; 528/74.5; 252/182.18; 554/29, 30, 174, 554/227
See application file for complete search history.

(56) References Cited

U.S. PATENT DOCUMENTS

| | | | |
|---|---|---|---|
| 2,984,679 A * | 5/1961 | Ehrlich et al. | 554/106 |
| 3,551,475 A * | 12/1970 | Brotherton et al. | 560/125 |
| 4,508,853 A | 4/1985 | Kluth et al. | |
| 4,518,722 A | 5/1985 | Schutt et al. | |
| 4,812,533 A | 3/1989 | Simone et al. | |
| 5,006,648 A | 4/1991 | Van der Plant et al. | |
| 5,596,085 A | 1/1997 | Silver et al. | |
| 6,107,433 A | 8/2000 | Petrovic et al. | |
| 6,359,023 B1 * | 3/2002 | Kluth et al. | 521/155 |
| 2002/0058774 A1 | 5/2002 | Kurth | |

FOREIGN PATENT DOCUMENTS

WO    WO 01/04225 A1    1/2001

OTHER PUBLICATIONS

Wright et al; Solid Polyurethane Elastomers; 1969; p. 36.*

* cited by examiner

*Primary Examiner*—Rachel Gorr
(74) *Attorney, Agent, or Firm*—Ian C. McLeod; Steven E. Merritt

(57) ABSTRACT

A solvent-free process for making a polyol fatty acid polyester composition useful for preparation of polyurethanes is described. These compositions are preferably made by reaction of a natural oil (from plant or animal) with a multi-functional hydroxyl compound derived from a natural source, such as sorbitol, in presence of an alkali metal salt or base such as potassium hydroxide as a catalyst which also acts to saponify the reaction mixture. The hydroxyl content of the prepared composition depends on the amount of the multi-functional hydroxyl compound used in the preparation. In another embodiment, the hydroxyl groups of these compositions are reacted with an isocyanate, such as the polymeric diphenylmethane diisocyanate (also known as 4,4'-diphenyl methane diisocyanate, or MDI) to form polyurethanes in a conventional manner.

6 Claims, 3 Drawing Sheets

POLYOL FATTY ACID POLYESTERS PROCESS AND POLYURETHANES THEREFROM

CROSS-REFERENCES TO RELATED APPLICATIONS

This application claims priority to Provisional application Ser. No. 60/466,823, filed Apr. 30, 2003.

STATEMENT REGARDING FEDERALLY SPONSORED RESEARCH OR DEVELOPMENT

Not Applicable.

Reference to a "Computer Listing Appendix Submitted on a Compact Disc"
Not Applicable.

BACKGROUND OF THE INVENTION (1) Field of the Invention

This invention relates to a process for preparation of compositions of polyol fatty acid polyesters from plant and animal oils, reacted with isocyanates in high yield. Compositions as prepared are particularly used to produce biobased polyurethanes.

(2) Description of Related Art

Most of todays commercially available polyols are produced from petroleum. However, the depletion of petroleum combined with its increasing price in our modern societies has encouraged researchers and governments to explore new ways to produce todays polymeric materials from renewable and cheap natural resources.

Polyurethane resins are widely used in various applications ranging from medical devices to automotive body panels. The success of polyurethane is due to its ability to be produced in various forms from flexible to rigid structures. Applications include areas such as insulation, packaging, adhesives, sealants and coatings. Moreover, polyurethanes are now finding a growing market in the sector of composites for automotive applications such as seat pans, sun shades, door panels, package trays and truck box panels.

Polyurethanes are made by reaction between isocyanate groups (NCO) with hydroxyl groups (OH) when multifunctional compounds are used. A crosslinking agent or a chain extender may be used. The extent of crosslinking is crucial since it will determine the final properties such as elongation, stiffness, strength and resistance to solvents.

Most of the polyols currently used (>90%) in production of polyurethanes are either polyether and/or polyester polyols derived from petroleum, a non-renewable resource which is depleting. The price of petroleum is unpredictable, and thus so are the prices of these polyols. Moreover, the production of these polyols poses an environmental problem.

Preparation of polyols useful for polyurethane production from cheap and renewable natural oils is highly desirable in order to alleviate the present environmental threat. Natural oils consist of triglycerides of saturated and unsaturated fatty acids. One natural oil, i.e. castor oil, is a triglyceride of recinoleic acid (a fatty acid that contains hydroxyl groups) and is used to produce polyurethanes. Despite good thermal and hydrolytic stability when compared to their counterparts produced from petroleum-based polyols, these castor oil-based polyurethanes have not found a wide application. The major drawback is the limited hydroxyl content (ca. 100–170 mgKOH/g) of the oil, thus restricting its use to production of flexible and semi-rigid polyurethanes. Morever, castor oil is produced in tropical regions, which increases its cost when compared to oils such as soybean and corn for example. Therefore, other ways to make inexpensive polyols with controllable hydroxyl number from natural oils are needed.

In the case of other natural oils, they must be chemically reacted and converted to multiple hydroxyl structures useful in making of polyurethane resins. From a chemical point of view, natural oils offer two reactive sites, the double bonds of unsaturated fatty acids, and the carboxyl ester group linking the fatty acid to the glycerol.

Polyols useful for preparation of polyurethanes have been synthesized from natural oils by chemical reaction at the unsaturated sites (see U.S. Pat. No. 4,508,853 to Kluth, et al., and U.S. Pat. No. 6,107,403 to Petrovic et al.). There are two ways to make natural oil-based polyols for polyurethane preparation: (i) Epoxidation of double bonds followed by hydroxylation and (ii) the hydroformylation of double bond and subsequent hydrogenation of the carboxyl group to yield hydroxyl moieties.

In the epoxidation/hydroxylation process, the double bond is converted into an epoxy group that is further opened in acidic solution. Usually, the conversion to the epoxy is performed by a peroxyacid or peroxide. Reaction is carried out in the presence of a common solvent for both the peroxyacid and the oil or in a bi-phasic medium and depending on the reagents used a lot of side products can be formed.

In the hydroformylation/hydrogenation process, the oil is hydroformylated in a reactor filled with a mixture of hydrogen ($H_2$) and carbon monoxide (CO) in the presence of a suitable organometallic catalyst (cobalt and rhodium catalysts work best) to form the aldehyde, which is subsequently hydrogenated in presence of a cobalt or nickel catalyst to form the required polyol. The reaction is carried out in a reactor.

These ways of making polyol from natural oils are limited to oils containing double bonds whose conversions to hydroxyl groups are not always well controlled. Indeed, undesirable aldehyde and epoxy groups are sometimes found in the polyol. Moreover, polyols with a high hydroxyl content (>250 mg KOH/g) are difficult to obtain. Besides, the use of a large number of reactants like peroxyacid, peroxide, hydrogen and carbon monoxide gases not only make the synthesis and processing more complicated with several byproducts whose removal to make pure polyol makes the process more energy intensive but also increase the overall cost of the resulting polyol. In addition, risks are associated with the use of reactants such as hydrogen and carbon monoxide gases and also peroxyacids (like m-chloroperbenzoic acid) and peroxide.

Some progress has been realized in the making of polyols for polyurethane preparation from natural oils by reaction at their carboxyl ester groups. In a patent (WO 01/04225 A1), Shah et al mixed vegetable oils with polyhydroxy alcohols such as glycerol in the presence of carboxylic acids and a catalyst under nitrogen atmosphere. In another recent patent, Kurth et al (U.S. Publication No. 2002/0058744 A1) described the preparation of vegetable oil-based polyols in a two-stage process. In the first stage they prepared a reaction product mixture of multifunctional alcohol and saccharide that reacts in the second stage with a vegetable oil in presence of a transesterification catalyst. The disclosure of this application is incorporated by reference herein.

Other pertinent applications and publications are: U.S. Pat. No. 4,518,722 to Volpenheim, U.S. Pat. No. 5,006,648 to Pleun Van der Plant, et al., U.S. Pat. No. 5,596,085 to Silver et al., and U.S. Pat. No. 4,812,533 to Simone et al. These are also incorporated by reference.

Objects

In accordance with the current invention, it is an object to overcome the deficiencies found in the described processes for making natural oil-based polyols in a cost effective one-stage process and to use them for making biobased polyurethanes. A further object of this invention is the control over the hydroxyl content of polyols and thus the possible tuning of the mechanical properties of the subsequent polyurethanes through the control of crosslinking within the polymer network. A further object is to provide a process which is 'green' and eco-friendly. It is finally an object to provide biobased polyurethanes which can be used in various applications as matrix for biocomposites, resins, foams and coatings.

SUMMARY OF THE INVENTION

Figure 1:
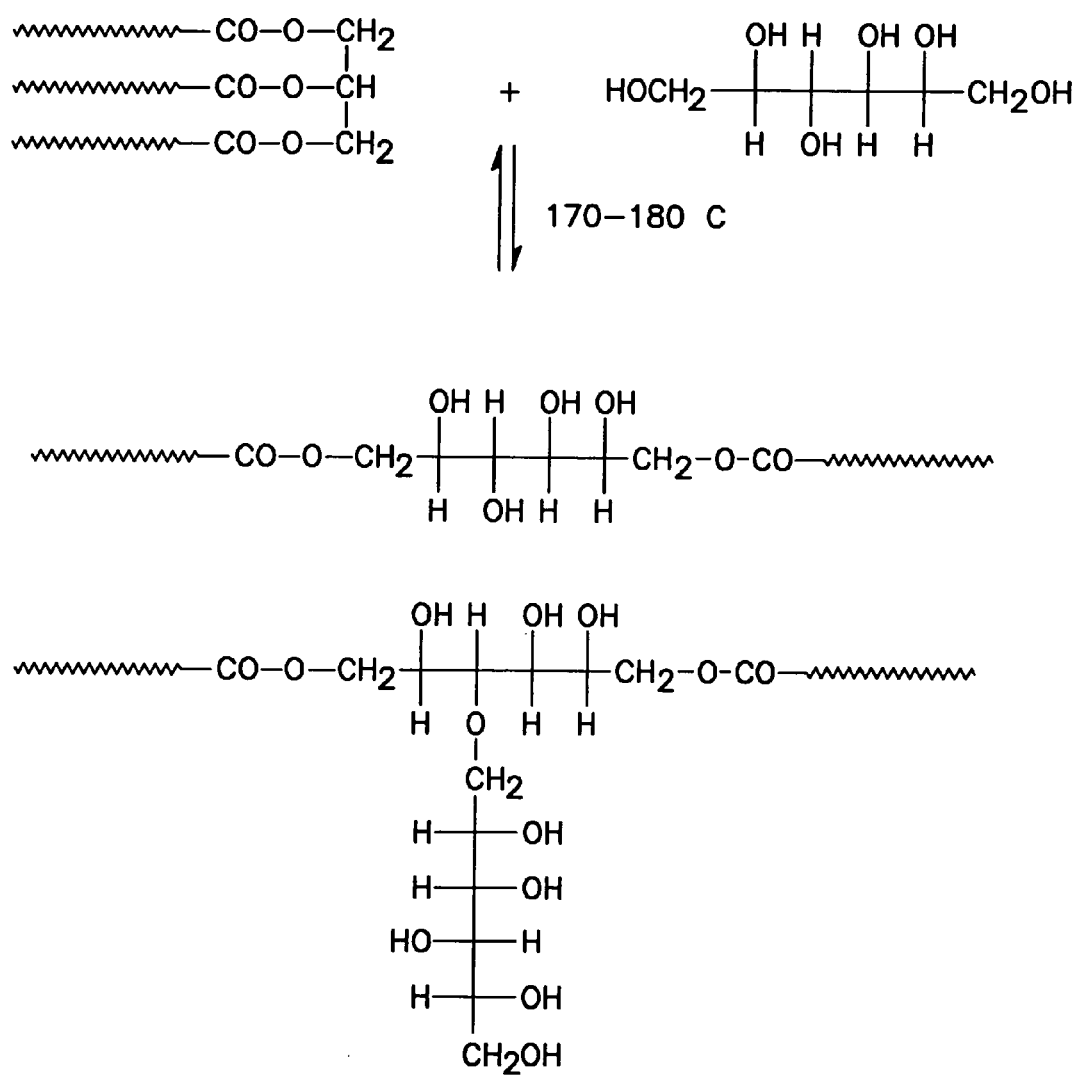
FIG. 1 is a schematic of the transesterification process of the present invention. The process produces a mixture of different polyol fatty acid esters.

The present invention relates to a process for the preparation of a polyol fatty acid ester which comprises:

(a) reacting in a reaction mixture in absence of a solvent, a polycarboxylic fatty acid ester which is an oil and a multi-functional hydroxyl compound with an alkali metal or alkaline earth metal base or salt as a transesterification catalyst with heating between about 100 and 250° C. to produce the polyol fatty acid ester; and (b) separating the polyol fatty acid ester from the reaction mixture. The preferred process is schematically shown in FIG. 1. The present invention also relates to a polyol prepared by the process. The alkali metal or alkaline earth metal saponifies the polycarboxylic acid ester which acts as an emulsifier in the reaction mixture. The reaction is preferably conducted in the presence of a transition metal compound. Preferably the multi-functional hydroxyl compound is a sugar alcohol. Preferably the sugar alcohol is sorbitol. Preferably the alkali metal base is potassium hydroxide. Preferably all the reactants are mixed and heated under an air atmosphere with agitation. Preferably a transition metal organic compound is used as an additional transesterification catalyst. Preferably the additional catalyst is a dibutyltin dilaurate.

The present invention also relates to a polyol fatty acid polyester composition which comprises a transesterification reaction product of:

(a) a natural oil which is a polycarboxylic fatty acid; and (b) a multifunctional hydroxyl compound from a renewable resource in the presence of an alkali metal or alkaline earth metal salt or base as a catalyst and saponifying agent.

The present invention further relates to a process for the preparation of a polyurethane which comprises:

(a) mixing in a reaction mixture the above composition with an isocyanate; and (b) curing the reaction mixture either at room temperature or higher temperatures. Preferably the composition is prepared from plant oils.

Preferably the isocyanate is the polymeric form of diphenylmethane diisocyanate (also known as 4,4'-diphenyl ethane diisocyanate, or MDI). Preferably the composition is blended with additives for tailoring properties of polyurethane. Preferably the composition is blended with a drying agent to remove water. Preferably the composition is blended with a foaming agent.

The present invention finally relates to a polyurethane prepared by reacting an isocyanate with the above composition. The isocyanate is preferably a polymeric form of diphenylmethane diisocyanate.

There is provided a process for making polyol compositions particularly from natural oils for use in production of biobased polyurethanes.

The main target of the present invention is to provide a greener method for making natural oil-based polyols for preparation of polyurethanes directly from natural oil in a one-step process by reacting a mixture of natural oil, a multi-functional hydroxyl compound and an alkali metal salt with agitation.

In the process of this invention, an alkali metal salt is required to avoid aggregation of the hydrophilic multi-functional hydroxyl compound and to favor formation of a homogeneous solution. Potassium hydroxide (KOH) has been found to be particularly efficient for that purpose (see U.S. Pat. No. 4,518,772 to Volpenheim and U.S. Pat. No. 5,006,648 to Pleun Van der Plan, et al.).

In the present invention, the production of polyol can be catalyzed by a transesterification catalyst. Preferably, the catalyst is a tin-based salt in an amount of 0.01 percent to about 5 percent by weight of the mixture.

The present process is carried out under atmospheric pressure and air atmosphere. The synthesis is conducted at temperatures of about 180° C. Preferably between about 100° C. and volatilization temperature of the reactants. No solvent is required for the synthesis of these polyols. No nitrogen (non-reactive) atmosphere is required for the process; however it can be used.

Further, this invention provides a method for making polyol compositions from all kinds of natural oil with hydroxyl content independent from the presence of double bonds in the oil.

This invention provides a method for making polyurethanes from natural oil-based polyol compositions. The hydroxyl number of the resulting polyols can be controlled by changing the content of the multi-functional hydroxyl compound during the synthesis. In the process of making polyol composition, the hydroxyl content can be tuned so that during the reaction of hydroxyl groups with isocyanate, the extent of crosslinking of the polyurethane can be controlled thus providing polyurethane ranging from soft rubber to rigid plastics.

DESCRIPTION OF PREFERRED EMBODIMENTS

The method of the present invention particularly provides an improved method for the preparation of natural oil-based polyol compositions useful for making polyurethanes. The process particularly involves reacting in bulk a natural oil with a multi-functional hydroxyl compound in presence of an alkali metal salt and eventually a salt able to catalyze the reaction.

Figure 2:
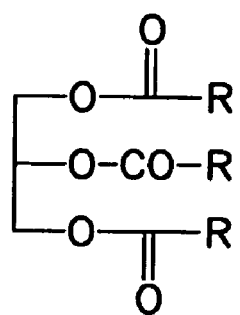
FIG. 2 is a chemical structure of a triglyceride contained in natural oils where R is an organic group used as a reactant.

In the present method any natural oil, or alternatively any partially hydrogenated, blown or genetically modified oils, can be used. Examples of oils considered include, but are not limited to, soybean, corn, cottonseed, peanut, castor, sunflower, canola, rapeseed, safflower, fish, seal, palm, tung, olive oil, or a blend of any of these oils. In nature the oils have triglyceride group in their structure (FIG. 2).

Figure 3:
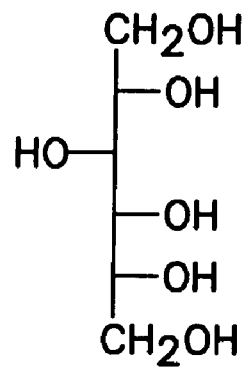
FIG. 3 is a chemical structure of sorbitol, which is one of the preferred reactants.

Any multifunctional hydroxyl compound can be used as reactant. Preferably, renewable sugar multi-functional compounds, which group comprises the mono-, di- and tri-saccharides like lactose, maltose, raffinose, and sucrose and sugar alcohols, such as sorbitol, xylitol, erythritol, mannitol, or any combination of such compounds. The preferred multi-functional hydroxyl compound is the inexpensive (~0.5 USD/lb) sorbitol (FIG. 3).

Preferred metal alkali catalyst include sodium and potassium hydroxide, or a blend of these, used in amount less than about 5 weight percent of the total weight. The purpose of adding this salt is to form fatty ester soap in situ that will acts as an emulsifier. Upon heating, KOH reacts with free fatty acid and triglyceride ester resulting in formation of an alkali metal fatty ester soap by saponification of the fatty acid ester. When the concentration of the soap becomes higher than the critical micelle concentration (CMC), a homogeneous solution is obtained due to the solubilization of the hydrophilic multi-functional hydroxyl compound into the hydrophobic oil.

The optimum amount of metal alkali salt to be added to the mixture depends on the amount of the multi-functional hydroxyl compound. The preferred metal alkali salt/multi-functional hydroxyl compound molar ratio falls in the range of 0.5/1 to 1/1 for efficient solubilization.

A salt or base able to promote transesterification reaction can be used. Metal alkoxide, carboxylate, oxide, halides can act as a catalyst. In this invention, the most suitable catalyst must be poorly sensitive to water. Indeed, the multi-functional hydroxyl compound being highly hygroscopic, water is present in the reaction mixture. Therefore, a transition metal carboxylate such as tin octanoate and dibutyltin dilaurate being less sensitive to water than metal alkoxide for example, are well suited for the reaction along with the metal salt or base. The preferred tin salt is dibutyltin dilaurate in amount varying from 0.01 to 5 weight percent of the total weight.

Figure 4:
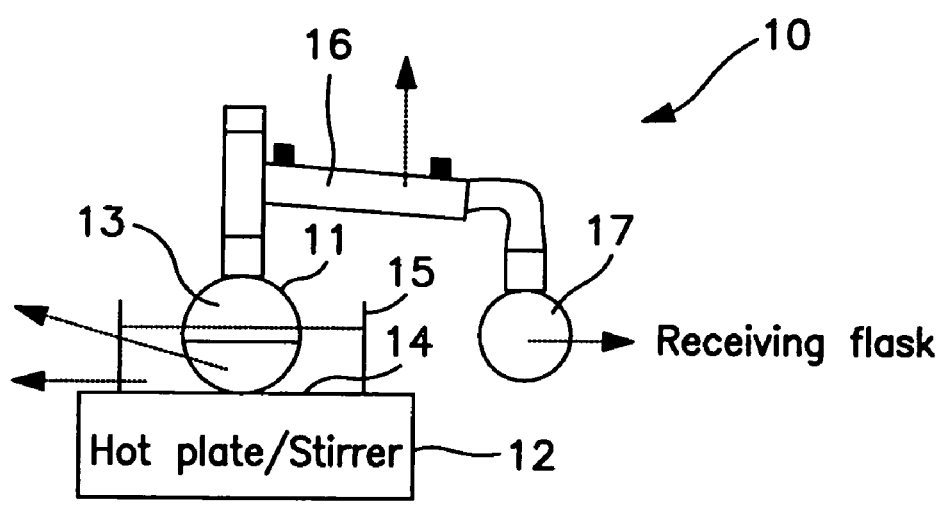
FIG. 4 is a schematic drawing of the apparatus used to make polyols from natural oils.
Figure 5A:
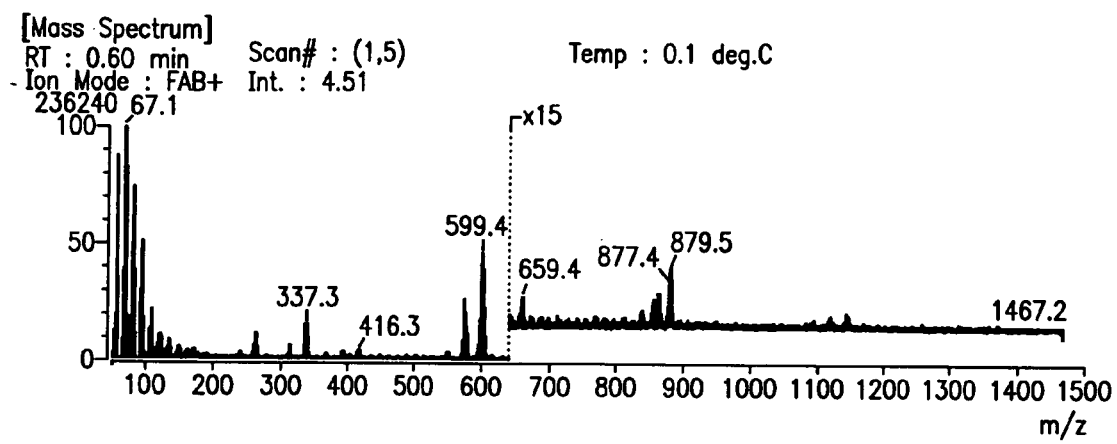
FIGS. 5A and 5B are FABMS spectra showing: (5A) soybean oil; (5B) soybean polyol prepared from soybean oil, sorbitol and KOH (Example 3).
Figure 5B:
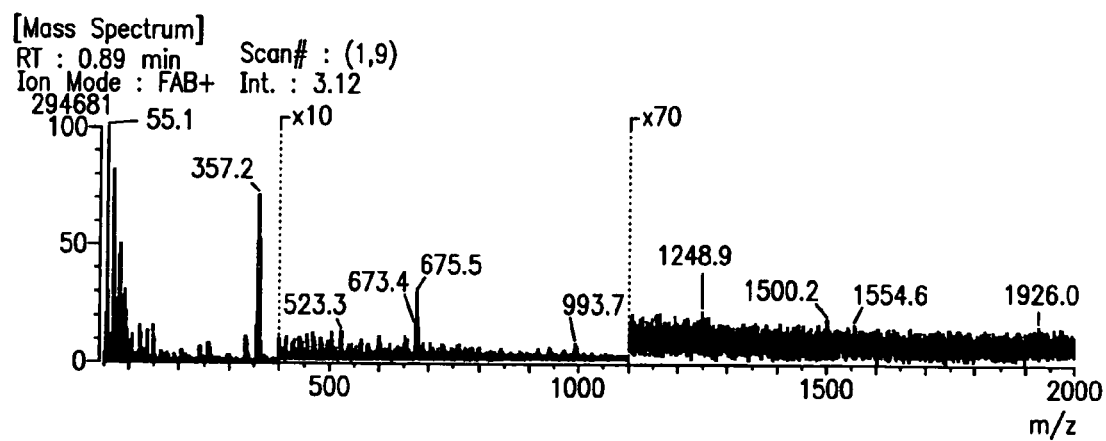

The synthesis of polyol compositions from natural oil is performed in bulk at temperature of 180 to 190° C. for reaction time ranging from 1 hour to 24 hours under air atmosphere and stirring. FIG. 4 shows an apparatus 10 which is a reactant flask 11 heated by a hot plate 12 with a magnetic stirrer containing the reactants 13. The flask 11 is in an oil bath 14 in container 15. A condenser 16 from flask 17 is converted to a receiving flask 11. The flask 11 receives volatilization by-products from the flask 14. Fast Atom Bombardment Mass Spectrometry as shown in FIGS. 5A and 5B confirm the chemical modification of soybean oil. Results indicated that sorbitol reacted with carboxy ester group of the oil as in Example 3.

The polyol compositions made by the process described in this invention have a hydroxyl content controlled by the amount of multi-functional hydroxyl compound. The higher the amount of these compounds the higher the hydroxyl content will be.

After reaction, the polyol compositions can be dissolved in chlorinated solvents, such as chloroform. A precipitate, containing mostly unreacted sorbitol and fatty ester soap, is formed and is filtrated off the chloroform solution which is then evaporated. Natural oil-based polyol compositions can be made in that way with yields ranging from 90 to 97%.

Polyols made by the process of this invention have hydroxyl number controlled by the amount of the multi-functional hydroxyl compound. In the case of the sorbitol hydroxyl numbers higher than 300 mgKOH/g are achieved with about 20 weight percent of this compound in the total weight of the reaction mixture.

In another embodiment of this invention, the polyol compositions made from natural oils can react with isocyanates to form polyurethanes. The extent of crosslinking within the polyurethane depends on both the functionality of the isocyanate and the hydroxyl number of the polyol used.

Any of the isocyanate, either crude or polymeric, may be used to make polyurethane. Examples of isocyanates that can be used include, but are not limited to, hexamethylene diisocyanate, 1,8-diisocyanato-p-methane, xylyl diisocyanate, diisocyanataocyclohexane, phenylene diisocyanates, tolylene diisocyanates such as 2,4-tolylene diisocyanate, 2,6-tolylene diisocyanate, chlorophenylene diisocyanate, bis (4-isocyanatophenyl)methane, diphenylmethane diisocyanate (also known as 4,4'-diphenyl methane diisocyanate, or MDI), naphatalene-1,5-diisocyanate, triphenylmethane 4,4, 4"-triisocyanate, and mixtures of such isocyanates. The average functionality of the isocyanate affects the crosslinking density of the polyurethane and thus the physical, thermal and mechanical properties.

In forming the polyurethane from natural oil-based polyol, the polyol can be blended with appropriate additives such as foaming agent, drying agent, filler, pigment, catalyst, and the like, to produce the formulated polyol. A stoichiometric amount of isocyanate is added and stirred with the polyol. The polyol/isocyanate mixture is maintained under vacuum until foaming stops and then poured into mold. Polyurethane can be cured either at room temperature or at higher temperature.

Polyurethanes can be prepared as soft rubbers to hard plastics depending on the envisioned applications by wisely choosing the isocyanate, the hydroxyl number of the natural-oil based polyol, the stoichiometric ratio of isocyanate and polyol, and the optional additives.

SPECIFIC EXAMPLES

The following examples are intended to promote a further understanding of the present invention. They are not meant in any way to limit the scope of this invention. Examples 1 to 8 show the preparation of the polyol compositions. Examples 9 to 11 show the preparations of the polyurethanes from these compositions.

Example 1

A soybean polyol was made from soybean oil (200.42 g), sorbitol (20.50 g), potassium hydroxide (6.06 g). Soybean oil, sorbitol and KOH were placed in a 500-milliliter one-necked flask 11 equipped with a condenser 16 and a magnetic stirrer as shown in FIG. 3. The flask was placed in an oil bath 14 thermostated at 185° C. After 2 hours, the flask was removed from the oil bath and allowed to cool down to room temperature. The mixture was dissolved in 150 ml of chloroform and recrystallized overnight in refrigerator. The formed precipitate was filtered off, the solvent evaporated under vacuum. The resulting product was a polyol whose hydroxyl number was determined by titration and found to be 151 mg KOH/g. Yield: 95 wt %.

Example 2

A soybean polyol was made from soybean oil (200.10 g), sorbitol (20.47 g), KOH (6.55 g). Soybean oil, sorbitol and KOH were placed in a 500-milliliter one-necked flask equipped with a condenser and a magnetic stirrer. The flask was placed in an oil bath thermostated at 180° C. After homogenization of the solution, dibutyltin dilaurate (0.80 g) was added. The flask was maintained at 185° C. for 1 hour then cooled down to room temperature. The mixture was dissolved in 150 ml of chloroform and recrystallized overnight in refrigerator °. The formed precipitate was filtered off, the solvent evaporated under vacuum. The resulting product was a polyol whose hydroxyl number was determined by titration and found to be 164 mg KOH/g. Yield: 92 wt %.

Example 3

A soybean polyol was made from soybean oil (60.30 g), sorbitol (15.37 g), KOH (3 g). First, soybean oil, sorbitol and KOH were placed in a 250-milliliter one-necked flask equipped with a condenser and magnetic stirrer. The flask was placed in an oil bath thermostated at 180° C. After homogenization of the solution, dibutyltin dilaurate (2.8 g) was added. The flask was maintained at 180° C. for 2 additional hours then cooled down to room temperature. The mixture was dissolved in 80 ml of chloroform and recrystallized overnight in refrigerator. The formed precipitate was filtered off, the solvent evaporated under vacuum. The resulting product was a polyol whose hydroxyl number was determined by titration and found to be 224 mg KOH/g. Yield: 90 wt %. The FABMS spectra is shown in FIG. 5B.

Example 4

A soybean polyol was made from soybean oil (20.16 g), sorbitol (7.68 g), KOH (1.39 g). Soybean oil, sorbitol and KOH were placed in a 100-milliliter one-necked flask equipped with a condenser and a magnetic stirrer. The flask was placed in an oil bath thermostated at 180° C. After homogenization of the solution, dibutyltin dilaurate (1.29 g) is added. The flask was maintained at 180° C. for 1 additional hour then cooled down to room temperature. The resulting product was a polyol whose hydroxyl number was determined by titration and found to be 367 mg KOH/g.

Example 5

A corn polyol was made from corn oil (20.88 g), sorbitol (5.14 g), KOH (0.96 g). Corn oil, sorbitol and KOH were placed in a 100-milliliter one-necked flask equipped with a condenser and a magnetic stirrer. The flask was placed in an oil bath thermostated at 180° C. After homogenization of the solution, dibutyltin dilaurate (0.95 g) was added. The flask was maintained at 185° C. for 1 hour then cooled down to room temperature. The resulting product was a polyol whose hydroxyl number was determined by titration and found to be 278 mg KOH/g.

Example 6

A peanut polyol was made from peanut oil (20.21 tg), sorbitol (5.16 g), KOH (0.96 g). Peanut oil, sorbitol and KOH were placed in a 100-milliliter one-necked flask equipped with a condenser and a magnetic stirrer. The flask was placed in an oil bath thermostated at 180° C. After homogenization of the solution, dibutyltin dilaurate (0.92 g) was added. The flask was maintained at 185° C. for 1 hour then cooled down to room temperature. The resulting product was a polyol whose hydroxyl number was determined by titration and found to be 327 mg KOH/g.

Example 7

A castor polyol was made from castor oil (20.12 g), sorbitol (5.16 g), KOH (1.01 g). Castor oil, sorbitol and KOH were placed in a 100-milliliter one-necked flask equipped with a condenser and a magnetic stirrer. The flask was placed in an oil bath thermostated at 180° C. After homogenization of the solution, dibutyltin dilaurate (1 g) was added. The flask was maintained at 185° C. for 1 hour then cooled down to room temperature. The resulting product was a polyol whose hydroxyl number was determined by titration and found to be 434 mg KOH/g.

Example 8

A cotton polyol was made from corn oil (100 g), sorbitol (25.6 g), KOH (5 g). Cottonseed oil, sorbitol and KOH were placed in a 250-milliliter one-necked flask equipped with a condenser and a magnetic stirrer. The flask was placed in an oil bath thermostated at 180° C. After homogenization of the solution, dibutyltin dilaurate (0.70 g) was added. The flask was maintained at 185° C. for 24 hours then cooled down to room temperature. The resulting product was a polyol whose hydroxyl number was determined by titration and found to be 265 mg KOH/g.

Example 9

A polyurethane was made from soybean oil-based polyol prepared in EXAMPLE 1. Soybean oil-based polyol (20.02 g) (OH number=151 mg KOH/g) was mixed with 10.88 g of BAYDUR 410 (polymeric MDI commercialized by Bayer Corp. (Pittsburgh, Pa.). The isocyanate index was 110. The mixture was maintained under vacuum for 2 minutes at room temperature and then cured 1 hour at 110° C. A rigid polyurethane with a glass transition temperature of 143° C. and storage modulus (G') at 30° C. of 330 MPa was obtained.

Example 10

A polyurethane foam was made from corn oil-based polyol prepared in EXAMPLE 5. Corn oil-based polyol (20.03 g) (OH number=278 mg KOH/g) was mixed with 19.67 g of BAYDUR 410 (polymeric MDI commercialized by Bayer Corp.). The isocyanate index was 110. The mixture was cured 3 hours at 125° C. A rigid polyurethane with a glass transition temperature of 197° C. and storage modulus (G') at 30° C. of 430 MPa was obtained.

Example 11

A polyurethane foam was made from castor oil-based polyol prepared in EXAMPLE 7. Castor oil-based polyol (20.05 g) (OH number=434 mg KOH/g) was mixed with 30.34 g of BAYDUR 410 (polymeric MDI commercialized by Bayer Corp.). The isocyanate index was 110. The mixture was cured 3 hours at 125° C. A rigid polyurethane with a glass transition temperature of 166° C. and storage modulus (G') at 30° C. of 690 MPa was obtained.

It is intended that the foregoing description be only illustrative of the present invention and that the present invention be limited only by the hereinafter appended claims.

We claim:

1. A process for the preparation of a polyurethane which comprises:
    (a) mixing in a reaction mixture a fatty acid polyester composition which comprises a transesterification reaction product of a natural oil comprising a polycarboxylic fatty acid; and a multifunctional hydroxyl compound from a renewable resource wherein the reaction product further comprises an alkali metal fatty acid ester soap formed in the reaction product, wherein the reaction product was separated into a chlorinated solvent, with precipitation of the soap and unreacted hydroxyl compound, which solvent was evaporated to provide the composition with an isocyanate; and
    (b) curing the reaction mixture either at room temperature or higher temperatures.

2. The process of claim 1 wherein the composition is prepared from plant oils.

3. The process of claim 1 wherein the isocyanate is the polymeric form of diphenylmethane diisocyanate (also known as 4,4'-diphenyl methane diisocyanate, or MDI).

4. The process of any one of claim 1, 2 or 3 wherein the composition is blended with varying amounts of the multifunctional hydroxyl compound for tailoring the properties of the final polyurethane.

5. The process of any one of claim 1, 2 or 3 wherein the composition is blended with a drying agent to remove water.

6. The process of any one of claim 1, 2 or 3 wherein the composition is blended with a foaming agent.

* * * * *